(No Model.)
J. H. WINN.
HARROW FRAME.
No. 269,494. Patented Dec. 19, 1882.
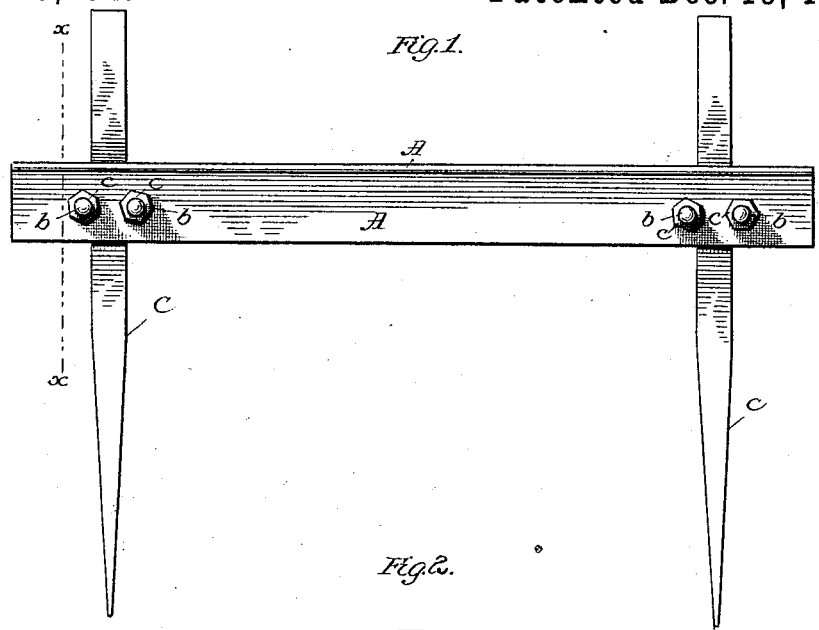
Attest:
Walter Donaldson
F. L. Middleton
Inventor
James H. Winn
by Ellis Spear
Atty

UNITED STATES PATENT OFFICE.

JAMES H. WINN, OF BENICIA, CALIFORNIA.

HARROW-FRAME.

SPECIFICATION forming part of Letters Patent No. 269,494, dated December 19, 1882.

Application filed August 9, 1882. (No model.)

*To all whom it may concern:*

Be it known that I, JAMES H. WINN, of Benicia, in the county of Solano and State of California, have invented a new and useful Improvement in Harrow-Frames; and I do hereby declare that the following is a full, clear, and exact description of the same.

My invention relates to an improvement in making harrows; and it consists principally in the improved construction of the harrow-frame and in the manner of fastening the teeth therein, as shown and hereinafter explained.

In the drawings, Figure 1 is a side view of the section of the frame, showing two teeth in position. Fig. 2 is a cross-section on the line $x\ x$.

I construct my harrow-frame of bars A A, of angle-iron, of any desired length or thickness, and adapted to be formed into a frame of any suitable shape and to hold any required number of teeth. These bars A A are reversed, and in that position are clamped together by bolts $b\ b$, so that they form practically a hollow rectangular box or tube. The upper and lower plates of these angle-irons are perforated at points opposite, and through these perforations pass the harrow-teeth C, as shown in Fig. 2.

The bolts $b\ b$ are placed closely together on each side of the harrow-teeth, so as to bear on the sides of such teeth and hold them rigidly in position. The bars A A are then clamped tightly together by nuts $c\ c$ on the threaded ends of the bolts.

It will be evident that my harrow-frame, besides being exceedingly light, since it is practically a tube, possesses great strength, and that it is exceedingly simple in construction, and may be cheaply manufactured.

I am aware that it is not new to form a harrow-frame from a single piece of U-shaped or channel iron; and I am also aware that two pieces of channel-iron have been held together by bolts and have been provided with notches to receive the teeth, and I desire to disclaim the said inventions.

I do not claim broadly the use of angle-irons in the frame of a harrow, as I am aware that single rails constructed of iron of that shape have been used before.

What I claim is—

1. A harrow-frame constructed of bars A A, of angle-iron, clamped together so as to form a rectangular tube, substantially as described.

2. The harrow-frame consisting of the reversed right-angle bars A A, in combination with the teeth, and with the clamping-bolts $b\ b$, placed on each side of said teeth, all substantially as described.

In testimony whereof I have signed my name to this specification in the presence of two subscribing witnesses.

JAMES H. WINN.

Witnesses:
 FRANK A. HILL,
 MATT. CLARKEN.